April 12, 1927.  G. A. SHIELDS  1,624,283
APPARATUS FOR MAKING TRANSPARENT SHEET GLASS
Filed Feb. 3, 1926    2 Sheets-Sheet 1
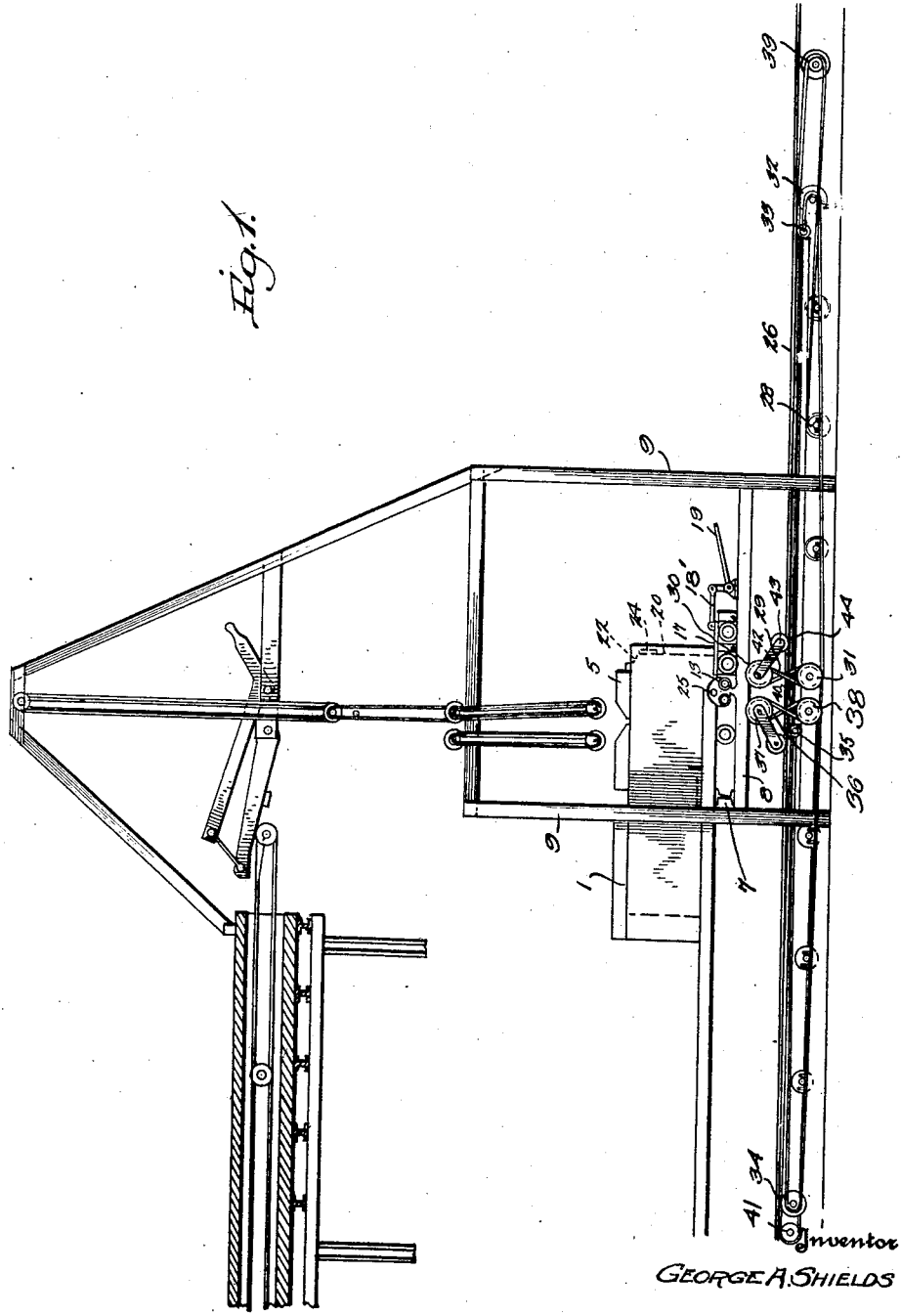

April 12, 1927.
G. A. SHIELDS
1,624,283
APPARATUS FOR MAKING TRANSPARENT SHEET GLASS
Filed Feb. 3, 1926    2 Sheets-Sheet 2
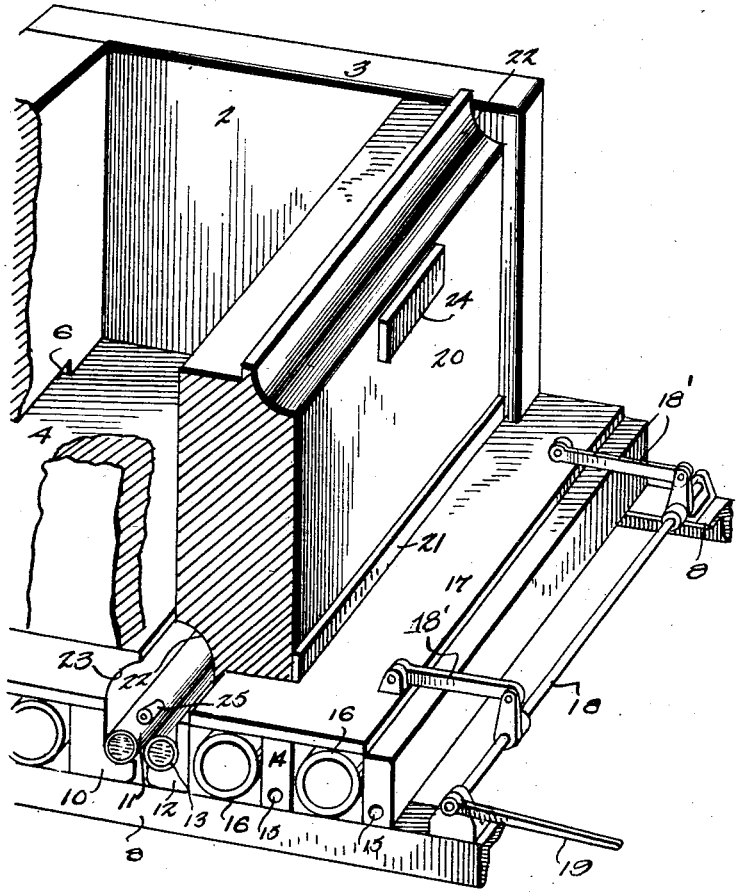
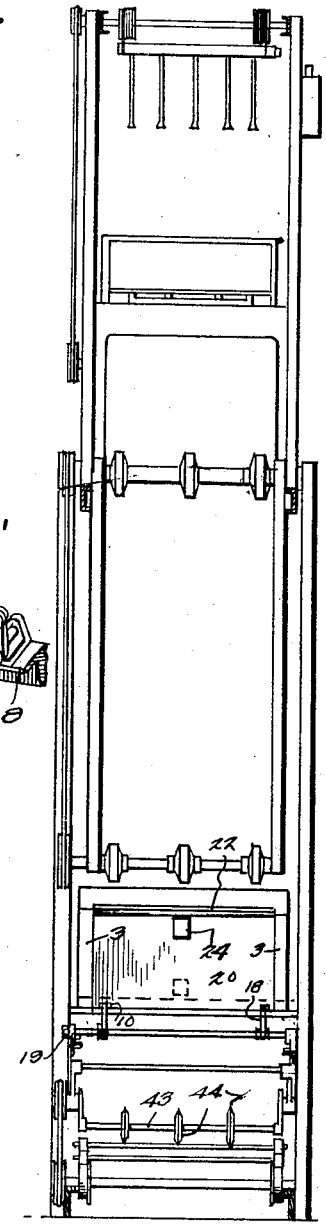
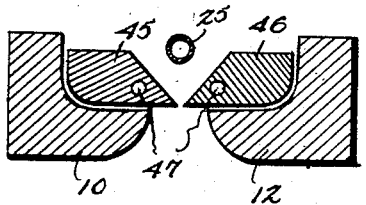
Inventor
GEORGE A. SHIELDS
By
Attorney Patented Apr. 12, 1927.

1,624,283

UNITED STATES PATENT OFFICE.

GEORGE A. SHIELDS, OF COLUMBUS, OHIO.

APPARATUS FOR MAKING TRANSPARENT SHEET GLASS.

Application filed February 3, 1926. Serial No. 85,763.

This invention relates to methods of making transparent sheet glass and apparatus therefor, and has for its primary object the provision of a machine by means of which transparent sheet glass can be produced in a finished state which will not require polishing or grinding of the sheet after it has left the machine.

A further object of the invention is to provide a machine so constructed that the flowing chamber for receiving the molten glass can be separated to permit the molten glass therein to gravitate between a pair of tubular members adjusted for forming the sheets of the required thickness.

I have discovered that transparent sheet glass can be produced in a finished state by simply permitting the molten glass to flow between stationary or fixed metal formers to form the sheet to the thickness required and then allowing the sheet to be suspended for a short time before coming in contact with any revolving or moving part. When the sheet is forced between revolving rolls the product obtained is not transparent and must be polished.

In the accompanying drawings I have shown several embodiments of the invention. In this showing,—

Figure 1 is a vertical longitudinal sectional view of the apparatus,

Figure 2 is an enlarged perspective detail view with the top of the flowing chamber and a portion of one side wall removed, Figure 3 is an end elevation, and Figure 4 is a detail view showing a modification of the outlet of the flowing chamber.

Referring to the drawings the reference numeral 1 designates an elevated tunnel from which the glass is delivered into the flowing chamber 2. The flowing chamber is formed of walls 3 of fire clay and is provided with a floor 4 and a top 5. The tunnel and flowing chamber are separated from each other by a wall having a slot 6 through which the glass flows. The flowing chamber is supported on I-beams 7 which in turn rest on angle irons 8. These angle irons are supported by a suitable frame 9. Beneath the floor of the flowing chamber I provide a stationary clay block 10 which is supported by the angle irons 8 and which is provided with a curved face. A metal tubular member 11 is arranged adjacent the curved face of the block 10. A similar curved block 12 is arranged adjacent the stationary clay block and serves as a housing for a second tubular member 13. These blocks do not contact with the tubular members but act as protection therefor to prevent cold air from striking the glass as it passes between the tubular members. A clay block 14 is arranged in the rear of the block 12 and is provided with metal reinforcements 15. This block rests on the angle irons 8 and is arranged between rollers 16 which cause it to travel on said angle irons. A casting 17 rests on these rollers and this casting is connected to a cross bar 18 by suitable links 18'. An operating lever 19 is arranged on one end of the cross bar. The casting 17 is adapted to support a block 20 which rests against a rib 21 formed in the casting. The block is provided with a curved portion 22 at its lower inner edge and in order to permit reversal of the block these curved portions are formed on two diametrically opposite corners. The curve 22 corresponds to a similar curve 23 in the adjacent end of the floor block (see Figures 1 and 2). The blocks 10 and 12 and the curved faces 22 and 23 of the block 20 and the floor respectively thus form a housing around the tubular members 11 and 13. As shown the face of the block 20 adjacent the curve 22 is provided with a projection 24. The tubular member 11 is arranged in a fixed position while the member 13 is supported on suitable blocks (not shown) and is adapted to be moved backward and forward by any suitable means (not shown). Water pipes may be connected to these members to permit water to flow through the tubes and prevent them from becoming overheated. A gas burner 25 may be arranged over the tubes so that the flame from the burner will pass over them.

A horizontally disposed conveyor 26 is arranged beneath the flowing chamber. This conveyor is formed of metal plates having asbestos arranged between them. It is adapted to be moved in either direction on suitable rollers 28 by means of a cable 29. This cable passes around drive pulleys 30 and 31 which may be driven from any suitable source of power. One end of the cable is extended longitudinally of the conveyor passing around a pulley 32 and is then connected to the end of the conveyor bed as at 33, while the other end passes around a pulley 34 at the opposite end of the conveyor track and is connected to the opposite end of the conveyor at 35. A similar cable 36 passes around a pair of pulleys 37 and 38 and is then extended longitudinally over a pulley 39 at one end of the conveyor frame and is connected to a cross bar 40 which rests on the conveyor bed. The other end of this cable extends over a pulley 41 arranged at the opposite end of the conveyor track and is connected to the other side of the bar 40.

The pulleys 30 and 37 are mounted on shafts which are connected to castings 42 supporting cross shafts 43. Circular cutters 44 (see Figure 3) are mounted on the shafts 43 and as will be apparent any number of these cutters may be placed on the shaft depending on the width of the sheet to be cut.

In operation, the fluid glass is delivered from the tunnel to the flowing chamber 2 through the passage 6. The tubular member 13 is adjusted with respect to the tubular member 11 for the thickness of sheet desired and the block 20 is moved by the lever 19 to provide an opening between the block and the curved wall 23 of the floor to permit the glass to flow to the housing in which the tubular members 11 and 13 are arranged. The block 20 controls the flow of glass and the projection 24 will cause a greater amount of glass to flow at the ends than at the central portion. The gas burner 25 causes a flame to pass over the tubes 11 and 13 and retains the glass at the proper heat. The sheet passing between the water cooled tubular members 11 and 13 is a finished transparent sheet that does not require polishing. When desired, the flow may be cut off by adjustment of the block 20. As the sheet of glass passes downwardly the conveyor is moved in one direction by the cables and pulleys at the same speed as the speed of flow of the glass. As the sheet engages the conveyor bed it passes under the cutters which cut it to the desired width. After the sheet is arranged on the conveyor it is moved from the conveyor bed to the leer rolls by the cross bar 40 through the cable 36.

In Figure 4 of the drawings, I have shown a slightly modified form of the invention in which the tubular members 11 and 13 are displaced by castings 45 and 46. As shown these castings rest on the curved faces of the clay blocks 10 and 12 and are provided with conduits 47 for the passage of water. The arrangement of the gas burner 25 with respect to these members is clearly shown in this view.

It is to be understood that the form of my invention herewith shown and described are to be taken as preferred examples of the same and that various changes in the shape, size, and arrangement of parts may be resorted to without departing from the spirit of the invention or the scope of the subjoined claims.

I claim:

1. In an apparatus of the character described, a flow chamber having an opening in the bottom thereof, and a pair of stationary cylindrical fluid cooled forming members arranged beneath said opening and spaced from each other.

2. In an apparatus of the character described, a flow chamber having an opening in the bottom thereof, the walls of the flow chamber being arcuately recessed adjacent said opening to form a housing, and a pair of stationary cylindrical fluid cooled forming members mounted in said housing.

3. In an apparatus of the character described, a flow chamber, one of the walls of said chamber being movable whereby an opening of predetermined size may be formed between the lower edge of said wall and the floor of the flow chamber, and a pair of stationary forming members arranged beneath said flow chamber in alinement with said opening.

4. In an apparatus of the character described, a flow chamber having an opening in the bottom thereof, a pair of stationary fluid cooled former members arranged beneath said opening, a burner arranged above and in spaced relation to the former members, and a conveyor arranged beneath said flow chamber and spaced therefrom, said conveyor being adapted to be driven at the same speed as the rate of movement of a sheet of glass flowing downwardly from said flow chamber.

5. A device constructed in accordance with claim 4 wherein a movable member is mounted on said conveyor and is adapted to feed the glass along said conveyor.

6. A device constructed in accordance with claim 4 wherein a flexible member is connected to the ends of said conveyor and passed over a plurality of pulleys to drive said conveyor.

7. In an apparatus of the character described, a flow chamber including a stationary wall and a movable wall, and means for actuating the movable wall toward the stationary wall whereby an opening of predetermined size may be formed between the lower edge of the movable wall and the stationary wall of the flow chamber.

In testimony whereof I affix my signature.

GEORGE A. SHIELDS.